United States Patent [19]

Collingwood

[11] Patent Number: 5,150,529
[45] Date of Patent: Sep. 29, 1992

[54] SIGNAL TRANSMISSION SYSTEM FOR MACHINE TOOLS, INSPECTION MACHINES, AND THE LIKE

[75] Inventor: David Collingwood, Kings Stanley, United Kingdom

[73] Assignee: Renishaw plc, Gloucestershire, United Kingdom

[21] Appl. No.: 334,536

[22] Filed: Apr. 7, 1989

[30] Foreign Application Priority Data

Apr. 12, 1988 [GB] United Kingdom ............... 8808611
Apr. 12, 1988 [GB] United Kingdom ............... 8808612

[51] Int. Cl.⁵ ..................... G01B 5/03; G08C 19/26
[52] U.S. Cl. ........................................ 33/503; 33/558;
340/680; 340/825.73; 340/825.72
[58] Field of Search ................... 33/556–558,
33/559–561, 503, 832; 340/870.01, 870.11,
870.12, 680, 686, 825.23, 825.58, 825.70, 825.71,
825.72, 825.73, 825.74, 825.75, 825.76, 539;
455/603, 617; 250/338.1, 339, 345, 349

[56] References Cited

U.S. PATENT DOCUMENTS

| | | |
|---|---|---|
| 3,639,907 | 2/1972 | Greatbatch . |
| 3,987,414 | 10/1976 | Tuma .................. 340/825.58 |
| 4,509,266 | 4/1985 | Cusack ....................... 33/561 |
| 4,545,106 | 10/1985 | Juengel ....................... 29/563 |
| 4,558,509 | 4/1987 | Juengel ....................... 33/558 |
| 4,605,925 | 8/1986 | Mark . |
| 4,608,714 | 8/1986 | Juengel ..................... 455/603 |
| 4,693,110 | 9/1987 | Juengel ....................... 33/558 |
| 4,771,283 | 9/1988 | Imoto ....................... 455/603 |
| 4,805,314 | 2/1989 | Hayashi et al. ............. 33/503 |

FOREIGN PATENT DOCUMENTS

| | | |
|---|---|---|
| 0010923 | 5/1980 | European Pat. Off. . |
| 2333391 | 6/1977 | France . |
| 1357109 | 6/1974 | United Kingdom . |
| 1535433 | 12/1978 | United Kingdom ......... 340/825.72 |

Primary Examiner—Thomas B. Will
Attorney, Agent, or Firm—Oliff & Berridge

[57] ABSTRACT

Probes (18A, 18B, 18C) can be interchangably mounted in the spindle (12) of a machine tool. Each probe has an optical signal transmission system, in which an optical signal from a light emitting diode (26) is transmitted to a receiver module 28. Such an arrangement requires a battery in the probe. To conserve battery power, the probe is normally in a stand-by mode, but can be switched on by an optical signal transmitted from the module 28 to a receiving photodiode 32 on the probe. This switch-on signal is modulated at a different frequency for each probe. Each probe contains a filter for the signal received by the photodiode 32, responsive only to the frequency of modulation of its own switch-on signal. Probes which are not intended to be switched on therefore do not react to the switch-on signal of another probe, thus conserving battery power further.

9 Claims, 3 Drawing Sheets

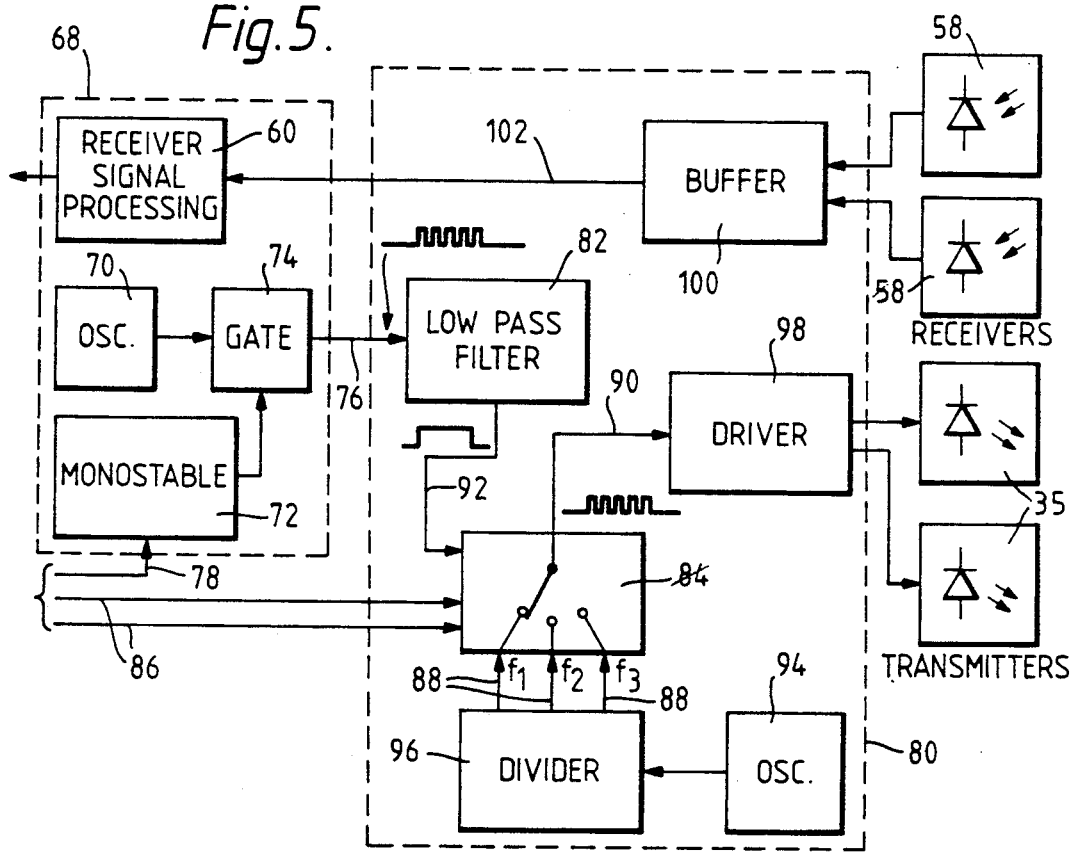
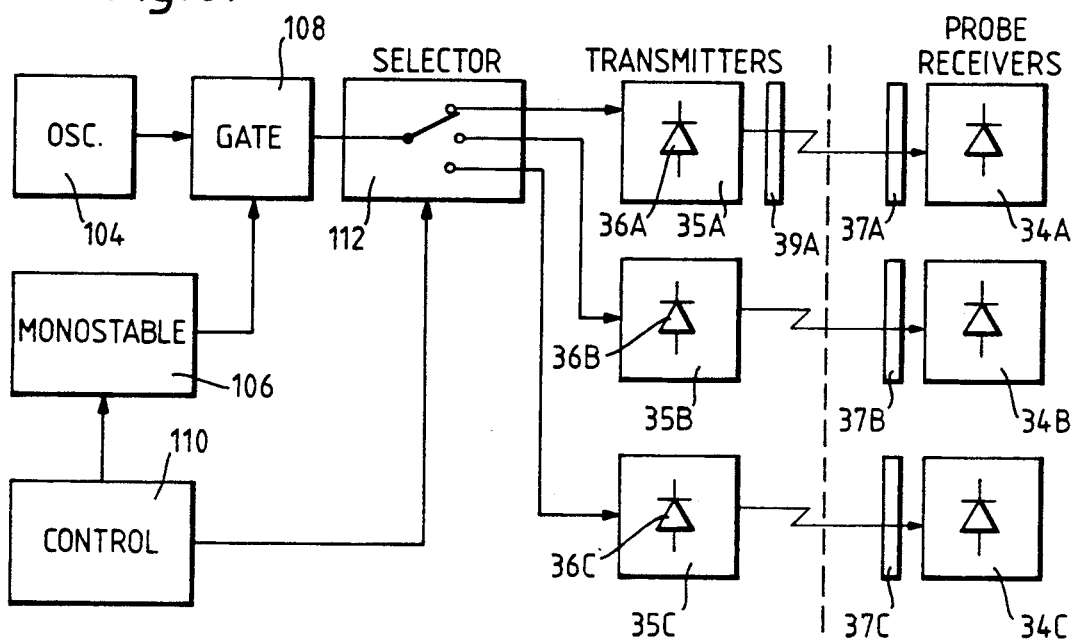

5,150,529

SIGNAL TRANSMISSION SYSTEM FOR MACHINE TOOLS, INSPECTION MACHINES, AND THE LIKE

FIELD OF THE INVENTION

This invention relates to signal transmission systems, e.g. for use on machine tools, coordinate measuring machines, inspection robots, and the like (hereinafter referred to as "machine tools").

DESCRIPTION OF PRIOR ART

Various probes are known for the inspection of workpieces on such machines. They include trigger probes which provide a trigger signal when they contact or attain a predetermined relationship with a workpiece surface, and measurement probes which provide a digital or analog output concerning the position of the surface.

Particularly when the probe is to be interchangeable with other tools, as in a machine tool, it is known to provide a wireless transmission system for transmitting the probe output signal back to an interface with the machine. For example, U.S. Pat. No. 4,509,266 describes an optical (infra red) transmission system. Such systems are also commercially available from Renishaw Metrology Ltd, of Wotton-under-Edge, Gloucestershire, United Kingdom. Similar systems can also be used to transmit signals from other sensors, e.g. relating to the presence or position of workpieces on the machine bed or on a conveyor or pallet, or to the status of a device such as a vise, a gripper or a robot. See, for example, U.S. Pat. No. 4,545,106.

These known systems include a battery power supply within the probe or other sensor, or within an optical transmission module attached thereto. To conserve battery power, it is obviously desirable that the optical transmission should only be switched on when required, and the above U.S. Pat. No. US 4,509,266 describes a two-way transmission system in which a receiver in the probe switches on the battery's power supply upon receipt of a high intensity infra red flash from a machine-mounted transmitter associated with the machine interface. The commercially available systems from Renishaw Metrology Ltd achieve a similar effect by transmitting a low intensity infra red signal from the machine-mounted interface module (which receives the signal transmitted by the probe) to a probe-mounted receiver. The low intensity infra red signal for this purpose is modulated on and off at a given frequency which can be picked out from ambient radiation by the receiver in the probe. This low intensity signal is, in effect, a short burst of infra red pulses at the given frequency.

Such systems have been found to work well in practice. However, it is increasingly the trend for machine tools to be provided with several probes for different inspection jobs, which are either usable simultaneously, or which are interchangeable and stored in a tool magazine when not in use. When one probe is to be used, it would be desirable to be able to switch it on without at the same time switching on other probes on the machine tool, or on adjacent machine tools. The same problem exists if such a transmission system is used to transmit signals from other sensors.

SUMMARY OF THE INVENTION

The present invention provides a machine tool signal transmission system comprising:

a plurality of battery-powered wireless sensor signal transmitting means, each having means for receiving a given signal and means for switching on the battery power upon receipt of that signal, means remote from the sensor signal transmitting means for generating and transmitting said given signals for each sensor signal transmitting means, each given signal having a unique characteristic for each sensor, said receiving means on each sensor signal transmitting means having means responsive to the unique characteristic associated with that sensor for switching on the battery power in response thereto, but not reacting to the given signal for other said sensor(s).

In a preferred embodiment, the given signals are transmitted optically. Preferably the unique characteristic is a given frequency of modulation of the transmitted signal for each sensor. Each sensor receiver then has a filter for the given frequency associated with that sensor.

BRIEF DESCRIPTION OF THE DRAWINGS

Preferred embodiments of the present invention will now be described, by way of example, with reference to the accompanying drawings, wherein FIG. 5 shows a second transmission and receiving circuit for an interface, and FIG. 6 shows a further transmission circuit for a interface, transmitting to a plurality of probes.

DESCRIPTION OF PREFERRED EMBODIMENTS

Figure 1:
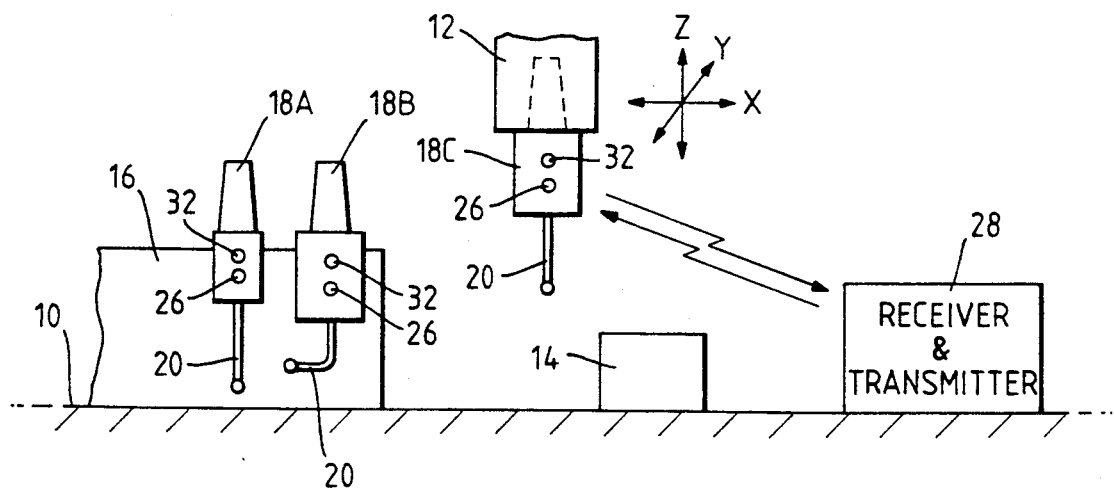
FIG. 1 is a schematic diagram showing an arrangement of a probe signal transmission system on a machine tool.

FIG. 1 shows the bed 10 and tool holding spindle 12 of a machine tool. The spindle 12 can be moved in X,Y and Z directions relative to the bed 10, in order to perform machining and inspection operations upon a workpiece 14 clamped to the bed 10. To machine the workpiece, the spindle 12 can pick up any of a variety of cutting tools (not shown) stored in a tool magazine 16, under the program control of a computer numerical control (not shown). To perform inspection operations, the spindle 12 can pick up any of a plurality of probes 18A,18B,18C which are also stored in the magazine 16.

Figure 2:
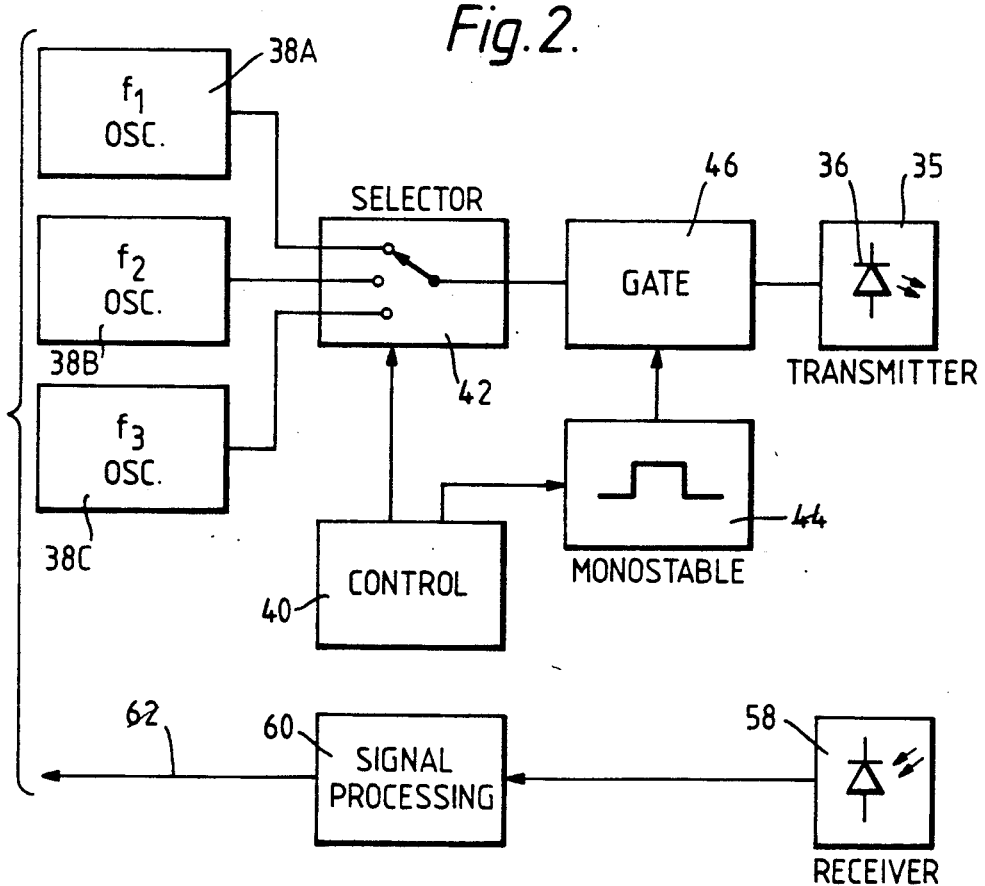
FIG. 2 shows a first transmission and receiving circuit in an interface module.

The probes shown in FIG. 1 are touch trigger probes, which have a circuit 22 (FIG. 3) for providing an output signal upon contact of a stylus 20 with a surface of the workpiece 14 in a well-known manner. To transmit these probe signals back to the machine, each probe is provided with a signal transmitter circuit as indicated at 23 in FIG. 3. The probe circuit 22 and transmitter 23 are powered by a battery 24 in the probe. The transmitter includes an infra red light emitting diode 26 on the surface of the probe as shown in FIG. 1, or if desired more than one such light emitting diode can be spaced around the circumference of the probe to provide omni-directional signal transmission. In use, the infra red signal transmitted from the light emitting diode 26 is received by a receiver and transmitter module 28 mounted on the machine. This module 28 has circuits as shown in FIG. 2, including a receiver photodiode 58 and signal processing circuit 60, from which the probe signal is passed on a line 62 via an interface (not shown) to the machine's computer numerical control. Circuits for transmitting the probe signal from the probe and for receiving and processing it in the module 28 are conventional, and need not be described further.

To conserve power, the battery 24 in each probe is connected to the probe circuit 22 and transmitter 23 via an electronic changeover switch 30. The switch 30 is switched (so as to supply power to the circuit 22 and transmitter 23 via a line 54) upon receipt of a given signal transmitted from the machine receiver and transmitter module 28. The given signal is produced in the machine module 28 by the remaining circuit shown in FIG. 2, and is received by a photo diode 32 on each probe, which is part of a receiver 34 of the probe.

As shown in FIG. 2, the transmitter 35 in the machine module 28 includes an infra red light emitting diode 36. The machine module circuit of FIG. 2 also comprises a plurality of square wave oscillators 38A,38B,38C, corresponding to the maximum number of probes 18A,18B,18C which are to be controlled. Each oscillator has a different frequency $f_1,f_2,f_3$, such as 5 kHz,6 kHz,7 kHz. When a given probe 18 has been picked up in the spindle 12 and is to be switched on, a signal to this effect is transmitted from the computer numerical control of the machine to a control circuit 40 within the module 28. The control circuit 40 then acts on a selector switch 42 to select a corresponding output of one of the oscillators 38A,38B,38C. It next triggers a monostable 44 to produce a pulse of a given duration, such as 250 ms. The output of the monostable 44 controls a gate 46 which passes the output of the selector switch 42, so that the transmitter 35 receives a 250 ms burst of square wave pulses at the frequency $f_1,f_2$ or $f_3$, as selected. This burst of pulses is transmitted optically to the receiver 34 of the probe, the infra red output of the light emitting diode 36 being effectively modulated (switched on and off) at the frequency $f_1,f_2$ or $f_3$.

The probe (FIG. 3) contains a band pass filter 48 which receives the output of the receiver 34. The filter 48 in each of the probes 18A,18B,18C is uniquely tuned to the appropriate frequency $f_1,f_2,f_3$, corresponding to that probe. Therefore, the signal transmitted to switch on the probe is passed by the band pass filter 48 only to that probe as selected by the selector 42, and the remaining probes in the magazine 16 are unaffected.

The output of the band pass filter 48 of the selected probe is taken to a conventional detector circuit 50, which detects the alternating signal by rectifying and smoothing it. The result is a pulse of a length corresponding to the 250 ms of the monostable 44 which is used to switch over the electronic switch 30, connecting the battery 24 to the probe circuit 22 and transmitter 23 and activating them.

The switch 30 is controlled by a timer 52, in order to switch off the probe circuit 22 and transmitter 23 after a predetermined time, e.g. 1 or 2 minutes. The timer 52 is powered via the switch 30 and line 54. It is reset for a further 1 or 2 minute period each time the probe circuit 22 changes state, i.e. when the stylus 20 makes or breaks contact with the workpiece 14. This means that the probe circuit is deactivated after a period of 1 or 2 minutes of non-use.

The receiver 34, filter 48 and detector 50 are powered from the battery 24 via the changeover switch 30 and a line 56. When the switch 30 provides power to the line 54, it removes power from the line 56. This ensures that the transmitter 23 cannot interfere with the receiver 34 of the probe, since they are never both activated simultaneously.

Figure 3:
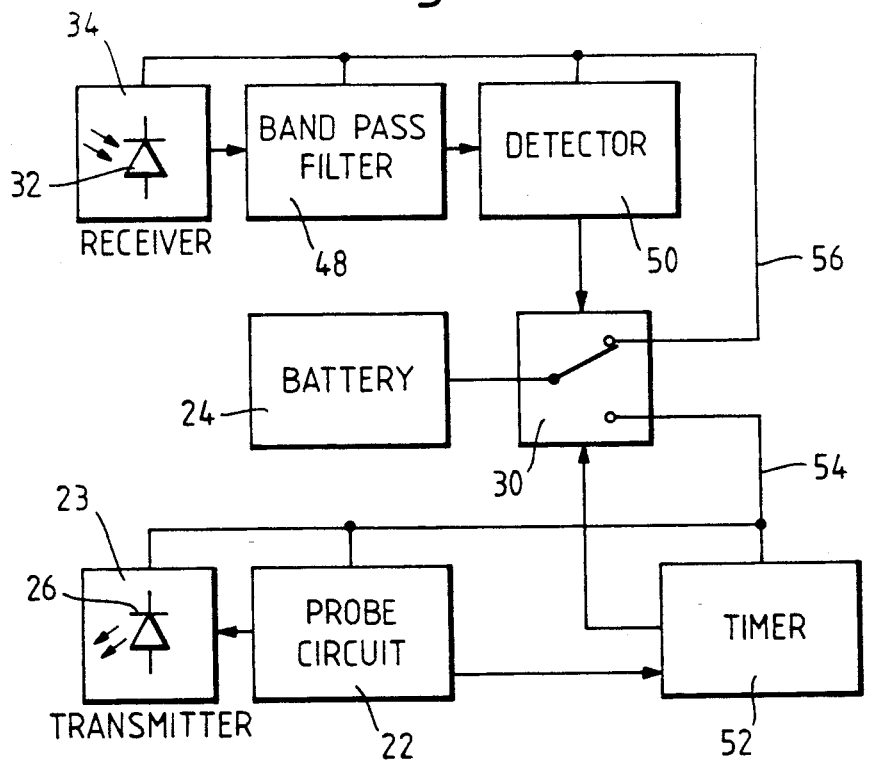
FIGS. 3 and 4 show two alternative receiving circuits for a probe.
Figure 4:
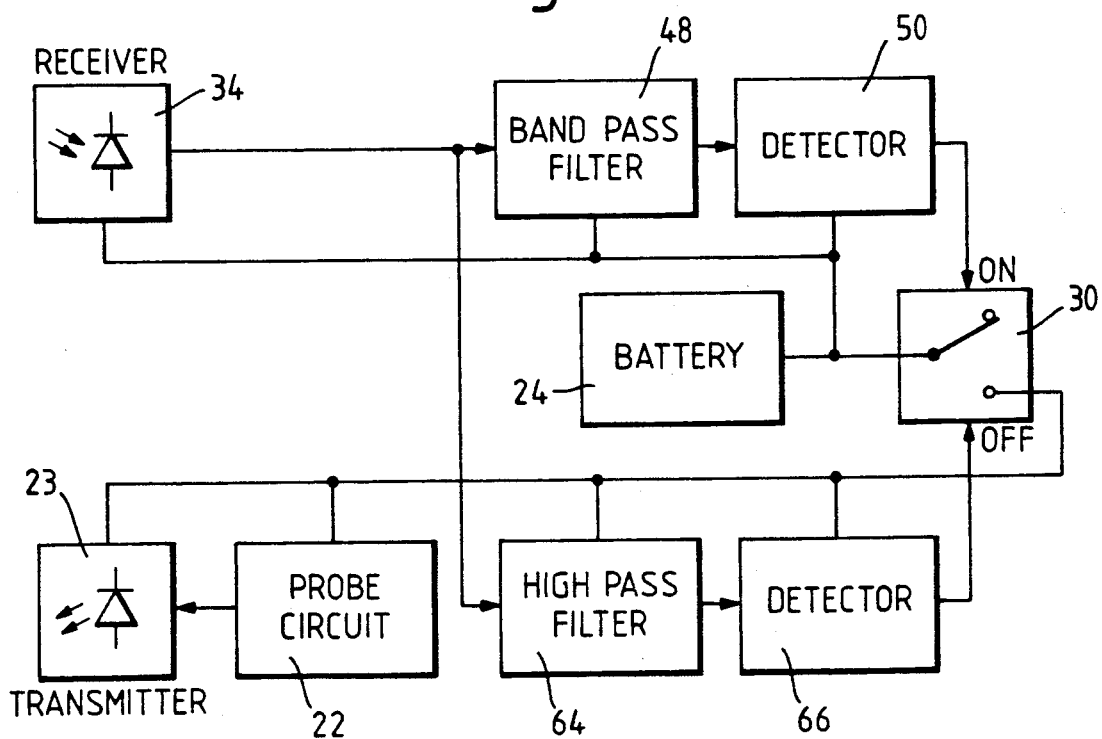

FIG. 4 shows an alternative arrangement for the probe receiving circuits of FIG. 3. Instead of using a timer 52, in this arrangement the probe circuit 22 and transmitter 23 are switched off by a further signal from the machine transmitter module 28. The module 28 generates and transmits this further signal in exactly the same way as the signals for switching on the various probes, but desirably the frequency of the oscillator 38A, 38B or 38C which generates the modulation for the switch-off signal is at a rather higher frequency than any of the switch-on signals. This ensures that it is readily distinguishable from any of the switch-on signals, and the same switch-off signal can be used for all probes.

The probe's receiving circuit in FIG. 4 includes the band pass filter 48 and detector 50, as in FIG. 3, for switching on the battery switch 30. When switched on, this powers not only the probe circuit 22 and transmitter circuit 23, but also a high pass filter 64 and corresponding detector 66. The high pass filter 64 receives the input from the receiver unit 34, and reacts only to the high frequency switch-off signal transmitted by the module 28. Upon receipt of this signal, it is detected by the detector 66, and used to switch off the switch 30, to conserve battery power.

The advantage of the arrangement in FIG. 4 is that it is not necessary to wait for the timer 52 in one probe to time out and switch the probe off, before bringing another probe into use. One reason for making the switch-off signal of a much higher frequency than the switch-on signals, rather than the other way around, is that the operational amplifiers used in the high frequency filter and detector circuits 64,66 tend to use rather more current than their lower frequency counterparts 48,50. In the interests of conserving battery power, therefore, it is better that they should only be switched on when the probe is in use, rather than having to be powered in a stand-by mode when the probe is not in use.

Although frequencies of 5 kHz,6 kHz,7 kHz have been quoted in respect of FIG. 2 for the frequencies $f_1,f_2$ and $f_3$, these frequencies may in fact be varied over a wide range, governed by the frequency response of the transmitting and receiving diodes 32,36. For example, these frequencies may be anywhere within the range from below 1 kHz to 1 MHz, or even higher (say up to 10 MHz) with appropriate diodes. The various frequencies chosen may advantageously be fairly widely spaced apart in the frequency spectrum, so that sharp tuning circuits in the band pass filters 48 are not necessary to exclude the signals for non-selected probes. With the frequencies mentioned above, it may be necessary for the band pass filters 48 to contain more than one stage of tuning.

FIG. 5 shows an alternative circuit for the receiver and transmitter module 28. In this case, the circuit 80 is intended as an expansion unit for an existing optical transmitter interface circuit 68, designed to transmit and receive signals to and from only a single probe. The existing interface 68 therefore includes an oscillator 70, monostable 72 and gate 74, which produce a burst of pulses on an output line 76 intended to switch on the single probe when instructed to do so by the numerical control of the machine on a line 78. In this respect, the circuits 70,72,74 act in a similar manner to one of the oscillators 38A, monostable 44 and gate 46 shown in FIG. 2. The interface 68 also includes the receiver signal processing circuit 60, similarly to FIG. 2.

The expansion unit 80 receives the burst of pulses on the line 76, and passes them through a low pass filter 82 in order to recreate a single pulse of a length corresponding to that generated by the monostable 72. This is used to enable the output of a selector circuit 84. The selector 84 is separately controlled by binary input lines 86, also from the machine's numerical control. These select one of three inputs 88, feeding the selected input through to the output line 90 to produce a burst of pulses whenever enabled on the line 92. The inputs 88 are driven by square waves at respective frequencies $f_1, f_2, f_3$. Thus, the output line 90 carries a burst of pulses at the selected frequency, whenever the selector output is enabled by the pulse on the line 92.

Whilst these selector inputs 88 could come from separate oscillators of the appropriate frequencies (as shown in FIG. 2), in the present circuit they are derived from a single oscillator 94, by a divider 96. The divider 96 is based upon a readily available integrated circuit normally used for electronic organs, and gives frequencies $f_1, f_2$ $f_3$ of 3483.6 Hz, 5215.6 Hz and 7812.5 Hz respectively. These frequencies are chosen because none of them coincides with the harmonics of the others, particularly the second and third harmonics. They are nevertheless easily derivable from the organ divider 96. Because the harmonics do not coincide, it is easy to provide reliable filtering circuits such as those shown in FIG. 3, in order to distinguish one switch-on signal from another.

The burst of pulses at the output 90 of the selector 84 can of course be used to drive a single transmitter unit 35, as previously, but we prefer to drive two or more such transmitter units 35 in parallel via a suitable driver circuit 98. The two or more transmitter units 35 can then be placed at different locations on the machine tool, so as to ensure that there is always a line of sight from at least one of the transmitters to the probe, whatever the position of the probe on the machine tool.

Each of the transmitter units 35 has an associated receiver unit 58, to receive the probe signal in parallel. Again, at least one of these units 58 will always be in a line of sight from the probe. The probe signals are combined in a buffer 100, and fed on a line 102 back to the conventional signal processing circuit 60 in the interface unit 68.

It will be understood that the receiving circuits in the probes, which receive the signals from the expansion unit of FIG. 5, may be similar to those shown in FIGS. 3 or 4.

FIG. 6 shows an alternative to the arrangement of FIGS. 2 to 5. In this arrangement, the switch-on signals are differentiated from each other not by the frequency of modulation of the light beam, but rather by the color of the light beam.

A burst of pulses at a given frequency is generated by an oscillator 104, monostable 106 and gate 108, upon receipt of a signal from a control circuit 110. This is similar to the corresponding circuits in the conventional interface 68 of FIG. 5. However, the burst of pulses produced by these circuits is fed to one of three possible transmitter units, 35A,35B,35C, by a selector circuit 112, under the control of the control circuit 110. The three transmitter units are arranged to transmit light beams of three different colors, for example red, green and infra red, or red and two different infra red wavelengths. These different color light beams are received by probe receiver units 34A,34B,34C which correspond to the receiver units 34 of FIG. 3 except that each is covered by a respective optical filter 37A,37B,37C which makes the receiver responsive only to one of the colors transmitted by the units, 35A,35B,35C.

The units 35A,35B,35C may be made to radiate light of the desired color by the use of light emitting diodes 36B,36C which emit only the respective desired colors. Alternatively, an appropriate optical filter 39A may be placed over the corresponding light emitting diode 36A, so as to filter out all but the desired color.

For fuller details of such multiple color transmission systems, reference should be made to our co-pending concurrently filed patent application U.S. Ser. No. 07/334,538, ABANDONED, claiming priority from UK patent application no. 8808612.9, applicant's case number 105, which is incorporated herein by reference. That co-pending application relates to the use of multiple colors for transmission of the probe signals back to the machine interface, rather than for transmission of the switch-on signals from the interface to the probes.

The probes 18A,18B,18C described have been touch trigger probes, which give a trigger signal upon contact with the workpiece 14. However, some or all of the probes used may be of other types. For example, they may be probes which provide a trigger signal upon attaining a predetermined proximity to the workpiece surface. They may also be scanning or measurement probes which provide an analog or digital measurement signal (as opposed to a trigger signal) relating to the displacement of a stylus caused by contact with the workpiece, or relating to the distance of a workpiece surface from the probe, detected in any suitable manner (e.g. optically). If desired, some or all of the channels may be reserved for sensors other than probes, e.g. sensors which provide signals relating to the presence or position of workpieces on the machine bed or on a conveyor or pallet, or to the status of a device such as a vise, or gripper or a robot. When the machine's numerical control requires information from such a sensor, it turns the sensor on in the same manner as described above.

What is claimed is:

1. A machine tool signal transmission system comprising:

a plurality of battery-powered wireless sensor signal transmitting means, each having receiving means for receiving a given switch-on signal and means for switching on the battery power upon receipt of that given switch-on signal, and means remote from the sensor signal transmitting means for generating and transmitting a plurality of given switch-on signals, one given switch-on signal for each sensor signal transmitting means, each given switch-on signal having a unique characteristic for each sensor signal transmitting means, said receiving means on each sensor signal transmitting means having means responsive to the unique characteristic of the given switch-on signal associated with that sensor signal transmitting means for switching on the battery power in response thereto, but not reacting to other given switch-on signals for other sensor signal transmitting means in said plurality of sensor signal transmitting means.

2. A signal transmission system according to claim 1, wherein the means for transmitting said given signals transmits the signals optically as an optical given signal.

3. A signal transmission system according to claim 2 wherein the unique characteristic is a given color of said optical given signal for each sensor means.

4. A signal transmission system according to claim 1, wherein said signal transmitting means includes means for switching off the battery power.

5. A signal transmission system according to claim 4, wherein said means for switching off comprises timer means for switching off the battery power after a predetermined time has elapsed.

6. A machine tool signal transmission system comprising:
   a plurality of battery-powered wireless sensor signal transmitting means, each having receiving means for receiving a given switch-on signal and means for switching on the battery power upon receipt of that given switch-on signal,
   means remote from the sensor signal transmitting means for generating and transmitting a plurality of given switch-on signals, one given switch-on signal for each sensor signal transmitting means, each given switch-on signal having a unique characteristic for each sensor signal transmitting means, wherein the unique characteristic is a given frequency of modulation of the given signal for each sensor signal transmitting means,
   said receiving means on each sensor signal transmitting means having means responsive to the unique characteristic of the given switch-on signal associated with that sensor signal transmitting means for switching on the battery power in response thereto, but not reacting to other given switch-on signals for other sensor signal transmitting means in said plurality of sensor signal transmitting means.

7. A signal transmission system according to claim 6 wherein said means responsive to the unique characteristic is an electronic filter responsive to said given frequency of modulation.

8. A signal transmission system according to claim 6 wherein said means for generating and transmitting said given signals includes means for enabling a burst of a said given signal in response to receipt of an external signal comprising a burst of a frequency modulated signal.

9. A machine tool signal transmission system comprising:
   a plurality of battery-powered wireless sensor signal transmitting means, each having receiving means for receiving a given switch-on signal and means for switching on the battery power upon receipt of that given switch-on signal, and
   means remote from the sensor signal transmitting means for generating and transmitting a plurality of given switch-on signals, one given switch-on signal for each sensor signal transmitting means, each given switch-on signal having a unique characteristic for each sensor signal transmitting means,
   said receiving means on each sensor signal transmitting means having means responsive to the unique characteristic of the given switch-on signal associated with that sensor signal transmitting means for switching on the battery power in response thereto, but not reacting to other given switch-on signals for other sensor signal transmitting means in said plurality of sensor signal transmitting means, wherein said signal transmitting means includes means for switching off the battery power, and wherein said means for switching off comprises means for receiving a further signal from said means for generating and transmitting said given signals.

* * * * *